Jan. 6, 1970     T. G. BRADLEY     3,488,223
ELECTROCHEMICAL CELL HAVING VOLUMETRICALLY
VARIABLE STORAGE CHAMBERS
Filed Aug. 17, 1966
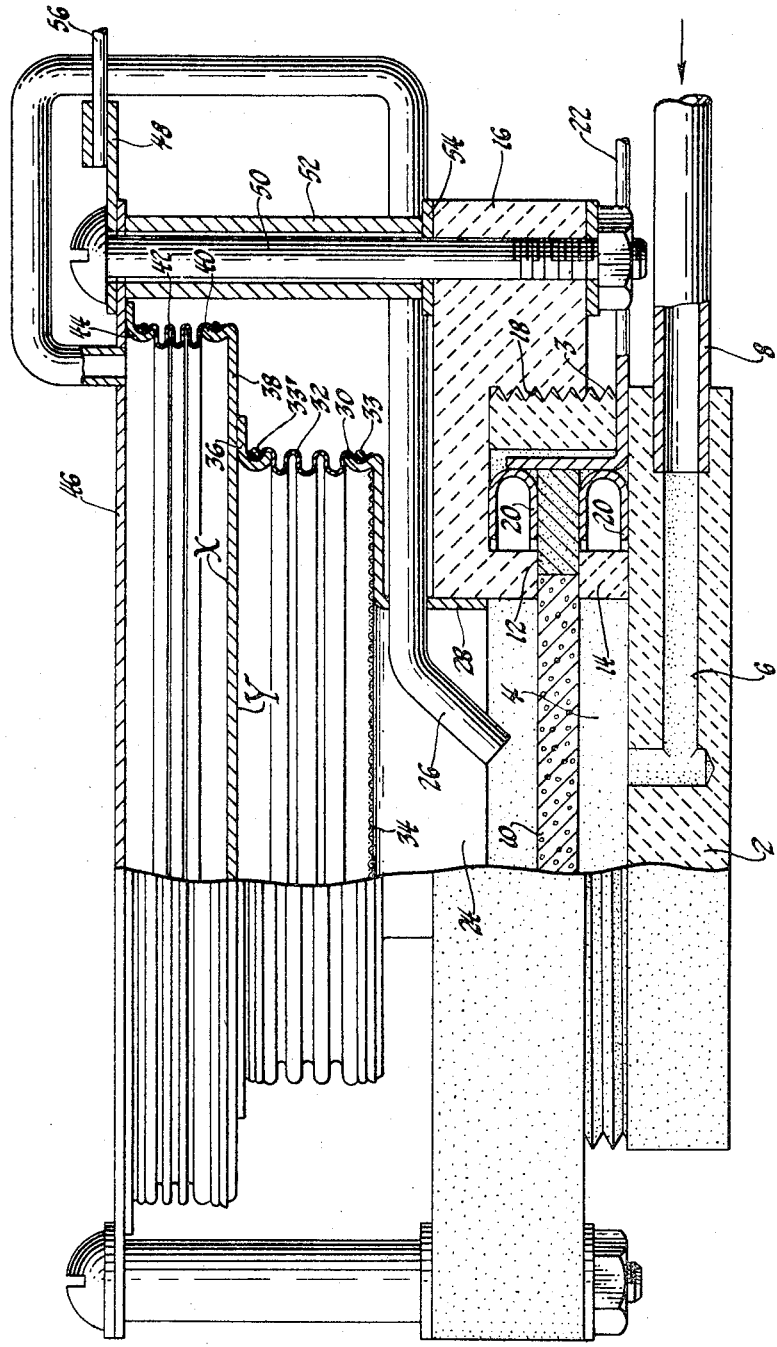
INVENTOR.
Thompson G. Bradley
BY
L. J. Wallace
ATTORNEY

United States Patent Office 3,488,223
Patented Jan. 6, 1970

---

3,488,223
ELECTROCHEMICAL CELL HAVING VOLUMETRICALLY VARIABLE STORAGE CHAMBERS
Thompson G. Bradley, Indianapolis, Ind., assignor to General Motors Corporation, Detroit, Mich., a corporation of Delaware
Filed Aug. 17, 1966, Ser. No. 573,037
Int. Cl. H01m 27/30, 27/02
U.S. Cl. 136—86                                11 Claims

---

ABSTRACT OF THE DISCLOSURE

An electrochemical cell having at least one liquid reactant and a liquid electrolyte which is the reaction product of the liquid reactant and the cell's counterreactant. The liquid reactant is stored in a volumetrically reducible storage chamber. During cell discharge the cell's reaction product is removed from a reaction zone and conveyed to a volumetrically expansible storage chamber. The respective storage chambers are linked one with the other in a manner such that concurrently the reactant storage chamber collapses and the reaction product storage chamber enlarges during discharge of the cell.

---

This invention relates generally to batteries and, more specifically, to batteries having at least one liquid reactant which reacts to form a liquid electrolyte in a reaction zone between the electrodes and which are destined for use in environments which are subjected to variations in gravitational or accelerational forces.

In the modern age of space and extraterrestrial exploration there is a need for reliable, efficient batteries for any of a variety of rocket and missile applications. Such applications involve severe operating conditions including extreme vibrational disturbances and varying gravitational and accelerational forces acting from various directions. Likewise, today's launching sequences frequently require a "hot hold" and "check out" capability which is not detrimental to the cell. Additionally, the size and weight of the battery should be as small as possible. Batteries of the type described present peculiar problems not found in other type batteries used similarly. The varying forces and directions of application influence the liquid levels, gas-liquid interfaces and electrochemical reaction interfaces. The levels and interfaces shift and distort as the missile maneuvers from one position to another, causing variations in the cell's electrical output and efficiency.

The maintenance of a uniform, fixed, electrochemical reaction interface between the reactant and the electrolyte is required for continuity and uniformity of operation. Similarly, the maintenance of a constant electrolyte thickness in the reaction zone is required to insure a substantially non-varying internal cell resistance. The formation of voids in either the reactant storage chamber or the reaction zone inhibits the satisfaction of these requirements. The voids create gas-liquid interfaces which shift as the missile maneuvers. If the gas-liquid interface contacts the eletcrode surface where a liquid-liquid reaction interface is established, a discontinuity in the reaction interface results. Similarly, under Zero-gravity conditions the liquid can float away from the electrode area, likewise disrupting the required reaction interface continuity. By my invention, I avoid these problems.

It is, therefore, an object of my invention to provide a liquid reactant-liquid electrolyte battery which is free of any voids in the respective liquid regions of the cell and which therefore operates uniformly in either a constant or a varying gravitational force environment.

It is a further object of my invention to provide a liquid electrolyte-liquid reactant battery which maximizes the use of available space by automatically minimizing the formation of space-wasting voids iin the respective liquid regions of the cell and utilizing the thus conserved space for reaction product storage.

It is a still further object of my invention to provide a process for the operation of a liquid reactant-liquid electrolyte battery, which process employs internally generated hydraulic forces acting in concert with volumetrically expansible and contractible liquid storage chambers to eliminate the formation of voids in the respective liquid regions of the cell.

These and other objects and advantages of my invention will become obvious from the more detailed description of the invention which follows.

FIGURE 1 is a partially sectioned elevation of one embodiment of a device employing my invention.

Briefly stated, my invention involves a liquid reactant-liquid electrolyte battery which employs a volumetrically expansible electrolyte storage chamber and a volumetrically reducible reactant storage chamber separated one from the other by a translatable member therebetween. The aforesaid chambers expand or contract, as appropriate, under the influence of internally generated hydraulic forces. The formation of electrochemical reaction products and the migration of same away from the reaction situs creates the hydraulic force. The battery of my invention may be operated as a primary or a secondary battery. As a primary battery under discharge, the hydraulic force is generated by the formation of the product of reaction of the electrode material. As a secondary battery under recharge, the hydraulic force is generated by the formation of the products of electrolytical decomposition.

FIGURE 1 typifies a type of device which may be constructed from the teachings of my invention. The device of FIGURE 1 is constructed primarily for use in conjunction with a $Li/LiCl/Cl_2$ system and although the following will be discussed solely in terms of such a system, I do not intend to limit myself thereto. In FIGURE 1 a bottom member 2 houses the cathode portion of the cell. The bottom member 2 is made from a $Cl_2$ resistant ceramic such as $Al_2O_3$ and is affixed to a ceramic spacer/insulator 16 in any convenient manner, such as by external threads 3. The insulator 16 may also be made of $Al_2O_3$, but I prefer to use BeO owing to its greater resistance to attack by dissolved lithium. A porous carbon cathode 10 is spaced from the bottom of member 2 by means of ceramic spacer 14 in order to provide a cathode plenum 4. A counterreactant, for example $Cl_2$, is admitted to the cathode plenum 4 via inlet 6, which is in turn fed by $Cl_2$ feed tube 8. A dense carbon ring 12 is placed about the periphery of the porous carbon cathode 10 and effectively serves the dual function of preventing the escape of chlorine from the periphery of the porous carbon cathode 10 while at the same time serving as a current collector for the cathode 10. Ceramic insulator 16 receives and retains the bottom member 2 in place by means of its internal mating threads 18. Insulator 16 additionally functions as a spacer between the porous carbon cathode 10 and the rest of the cell components. Spring elements 20 perform the dual function of sealing and current collecting. The elements 20 and the dense carbon ring 12 contact the cathode lead 22 which extends externally of the cell. A flanged annular member 28 mates with the spacer/insulator 16, as shown, to effect a reaction zone 24 between the cathode 10 and the anode interface fixing means 34. For a secondary battery the interface fixing means 34 is preferably such as disclosed and claimed in copending United States patent application Ser. No. 550,514, filed May 16, 1966, in the name of Dominicus A. J. Swinkels. A conduit 26 extends from within the reaction zone to a point within the lithium chloride excess electrolyte storage chamber. As excess electrolyte is formed in the reaction zone 24 during discharge, it is forced through the conduit 26 into the electrolyte storage chamber hydraulically expanding same. The flanged member 28 additionally has an annular lip 30 extending axially from the outer periphery of the flange which lip serves to engage and hold one end of the lithium storage chamber wall 32 by means of a clamp 33. The lithium chamber walls are thin, flexible and bellows-like in shape to permit deformation under applied pressure. The volume of the chamber is readily reduced by the application of hydraulic pressure to the chamber. This pressure is generated automatically within the cell by the electrochemical formation and displacement of electrolyte under discharge conditions. The upper portion of the bellows-like lithium chamber wall 32 engages the annular lip 36 and is held in place by means of clamp 33'. The annular lip 36 is affixed to a place member 38 which serves as a common wall/separator between the two chambers. The wall 38 is freely translatable in the direction of the reactant chamber under the urgings of the internally generated hydraulic pressure. The wall acts much like a piston having two faces X and Y each in contact with a different liquid, but having different cross sectional areas exposed to the liquids such that the ratio of the cross sectional areas is equal to the ratio of the volume of a unit quantity of reactant to the volume of electrolyte produced from that unit quantity of reactant. In the case of Li and LiCl that ratio is about 1:1.93 at 650° C. The plate/piston 38 likewise has an annular lip 40 at its periphery which serves to engage and hold the bellows-like wall 42 of the electrolyte storage chamber. Similarly, the upper portion of bellows-like wall 42 engages lip 44 and is retained in place by another clamp. Annular lip 44 is affixed to end plate 46 which serves as the closure of the electrolyte storage chamber. Conduit 26 is affixed to end plate 46 in any convenient manner. A reactant-electrolyte interface fixing means 34, such as disclosed and claimed in copending United States patent application Ser. No. 550,514, filed May 16, 1966 in the name of Dominicus A. J. Swinkels, a screen, section of porous metal, or perforated disc, which is preferentially wet by the reactant serves to maintain the location of the reactant-electrolyte reaction interface and thereby insures a uniformly thick reaction zone, regardless of gravitational force variations. Obviously when there are no force variations and the direction from which gravity acts is normal to the cathode 10, member 34 is not required though still desirable. Such would be the case where the cell was used in a permanent installation on earth. The cell is sealed and rigidized by the application of a plurality of clamping bolts 50 acting in concert with spacing sleeves 52 and washers 54. An electrical connector 48 serves as the external lead from the anode of the cell.

When fully charged and ready for operation, the reactant chamber is at its volumetric maximum and the electrolyte chamber ideally at its volumetric minimum. The volumes of the respective chambers at capacity are ideally established to correspond to the equivalent volume of the reactant consumed and the electrolyte formed on discharge. However, some excess electrolyte may be preplaced in the electrolyte chamber in which case that much more electrolyte storage volume is added to the aforesaid equivalent volume. During discharge electrolyte is displaced from the reaction zone by the formation of more electrolyte and is forced through the flow path and into the electrolyte storage chamber. The electrolyte storage chamber fills and expands, hydraulically forcing the translatable separator member in the direction of the reactant chamber which is being depleted. Similarly, during recharge, the reverse occurs and reactant is formed and fills the reactant storage chamber, thereby collapsing the electrolyte storage chamber. Hence, automatically, under operating conditions utilization of storage space is maximized, gas voids in the respective chambers eliminated, and an internally generated hydraulic force effected. The elimination of the voids precludes the occurrence of the problems incident to the sloshing of the liquids under positive gravitational conditions and floatation of same under weightless conditions.

The hydraulically effected chamber contraction and expansion acts in concert with an electrochemical reaction interface retention means, to insure the requisite continuity and spacing of that interface with respect to the interface established at the counterelectrode. The interface retention means separates the reactant storage chamber from the reaction zone and defines one of the boundaries of each. This retention means substantially fixes the location of the electrochemical reaction interface between the reactant in the storage chamber and the electrolyte in the reaction zone. Owing to the intrinsic pumping action of my invention the electrolyte average thickness remains the same, voids in the reactant chamber are eliminated, and hence the interface retention means of my battery has a less demanding role than has similar members of the prior art. Herein, the retention means is used primarily for preventing local aberrations in the reactant-electrolyte interface due to randomly oriented accelerations. By randomly oriented accelerations, I mean forces having a magnitude in excess of zero and acting in a direction other than normal to the principal plane of the retention means. Obviously when the direction of the force is normal to the cathode 10, the retention means is not required.

As fresh electrolyte is formed in the reaction zone during discharge, the excess is displaced to the storage chamber. Hence, the volume and, more importantly, the thickness of the reaction zone remain constant. Maintenance of a uniformly thick reaction zone insures a relatively constant internal cell resistance. Were the reaction zone allowed to thicken, as is done in some cells by not providing a separate electrolyte storage means, the cell's internal resistance would increase with the consequent effect that the heating rate would increase, and the operational voltage and power density would decrease.

In the cold predischarged state of the preferred embodiment of my invention, the reactant storage chamber is full of solid lithium, the reaction zone full of solid electrolyte, and the electrolyte storage chamber substantially collapsed. When heat is applied to the cell, the lithium melts and the electrolyte fuses. The initial electrolyte may be a low melting eutectic mixture. Heat may be applied to the entire cell in any acceptable manner as by a heated environment or by heating units in the solid liquid regions of the cell. How the cell is heated does not constitute part of my invention.

Once the cell is heated, by any convenient means, to the desired operating temperature chlorine is admitted to the cell, an external circuit completed through leads 22 and 56, and current begins to flow. With the production of current, lithium is consumed, and lithium chloride formed. The lithium chloride formed is conveyed to the expansible electrolyte storage chamber where it hydraulically expands same with an incident contraction of the reactant storage chamber. The converse is true, of course, when the cell is being recharged and lithium is being formed at the expense of the consumption of lithium chloride.

The battery may be chemically and electrochemically shut down for "hold" and "check" periods without deleteriously affecting the cell by either opening the external circuit, stopping the flow of $Cl_2$, or both.

As a general proposition the selection of materials for a $Li/LiCl/Cl_2$ system is probably more important than in other less corrosive systems. For purposes of the specific cell shown here, I prefer to restrict my selection of materials such that $Cl_2$ is exposed only to $Al_2O_3$, BeO, or graphite; lithium is exposed only to nickel or stainless steel; and, lithium chloride is exposed only to Ni, stainless steel, $Al_2O_3$ or BeO. The bellows-like flexible chamber walls are preferably made from thin pure nickel. In addition to minimizing corrosion, the malleability of Ni minimizes the force required to effect the deformation of the chambers.

While I have described my invention solely in conjunction with a single embodiment thereof, I do not intend to be limited thereto, except as recited in the appended claims.

I claim:

1. An electrochemical cell for use with at least one consumable liquid reactant which is storable in said cell, a counterreactant, and an electrolyte which is the reaction product of said reactant and said counterreactant, said cell comprising first means for fixing a reactant-electrolyte electrochemical reaction interface, second means for fixing a counterreactant-electrolyte electrochemical reaction interface, a reaction zone between said first and second interface fixing means for containing said electrolyte, first volumetrically reducible storage means for said consumable liquid reactant, second volumetrically expansible storage means for said reaction product, a translatable common separator member between said first and second storage means and means communicating said reaction zone with said second storage means for passing the reaction product formed in said zone during discharge of said cell to said second storage means to fill said second storage means whereby translation of said member toward said first storage means results.

2. The cell as claimed in claim 1 wherein said translatable member is a piston having at least two faces in respective communication with said first storage means and said second storage means, and the ratio of the areas of the respective faces of said piston is approximately equal to the ratio of the volume of a unit quantity of said reactant to the volume of said reaction product producible from said unit quantity.

3. The cell as claimed in claim 1 wherein said first and second storage means are chambers having bellows-like walls, said translatable separator member is a wall common to both chambers and the ratio of the volume of said first storage means, when full of reactant, to the volume of said second storage means when full of reaction product, is approximately equal to the ratio of the volume of a unit quantity of said reactant to the volume of said reaction product producible from said unit quantity.

4. The cell as claimed in claim 3 wherein said reactant is an alkali metal, said counterreactant is a halogen and said reaction product is the alkali metal halide corresponding to said alkali metal and said halogen.

5. The cell as claimed in claim 4 wherein said alkali metal is lithium, said halogen is chlorine, said reaction product is lithium chloride and said ratio is about 0.52 at 650° C.

6. An electrochemical cell comprising at least one consumable liquid reactant stored in said cell, means for providing a counterreactant, an electrolyte which is the reaction product of said reactant and said counterreactant, first means for fixing a reactant-electrolyte electrochemical reaction interface, second means for fixing a counterreactant-electrolyte reaction interface, a reaction zone between said first and second interface fixing means for containing said electrolyte, reactant storage means communicating with said first interface fixing means, reaction product storage means adjacent said reactant storage means, said storage means each sharing a common translatable separator member situate between said respective storage means and adapted to move in the direction of said reactant storage means upon depletion of said reactant and under the influence of the formation of said reaction product during discharge of said cell, said movement being at a rate commensurate with the volumetric rate of depletion of said reactant and the volumetric rate of production of said reaction product and means communicating said reaction zone with said reaction product storage means for passing the reaction product formed in said zone to said reaction product storage means.

7. The cell as claimed in claim 6 wherein said reactant-electrolyte interface fixing means is a porous material which is more wettable by said reactant than by said electrolyte.

8. The cell as claimed in claim 6 wherein said reactant and reaction product storage means are respectively volumetrically reducible and expansible chambers, said translatable member is a piston having at least two faces in respective communication with said reactant and said reaction product chambers, and the ratio of the area of the reactant contacting face of said piston to the area of the reaction product contacting face of said piston is approximately equal to the ratio of the volume of a unit quantity of said reactant to the volume of reaction product producible from said unit quantity of reactant.

9. The cell as claimed in claim 6 wherein said reactant and reaction product storage means are respectively volumetrically reducible and expansible chambers having bellows-like walls, said separator member is a well common to said chambers and wherein the ratio of the volume of said reactant chamber at full capacity to the volume of said reaction product chamber at full capacity is approximately equal to the ratio of the volume of a unit quantity of said reactant to the volume of reaction product producible from said unit quantity.

10. The cell as claimed in claim 9 wherein said reactant is an alkali metal, said electrolyte is an alkali metal halide, said counterreactant is a halogen and said first interface fixing means is a porous material wettable by said alkali metal.

11. The cell as claimed in claim 10 wherein said alkali metal is lithium, said electrolyte is lithium chloride, said halogen is chlorine and said ratio is about 0.52 at about 650° C.

References Cited

UNITED STATES PATENTS 3,014,976   12/1961   Blackmer.
3,031,518   4/1962   Werner et al.

WINSTON A. DOUGLAS, Primary Examiner

D. L. WALTON, Assistant Examiner

U.S. Cl. X.R.

136—159, 162; 204—225, 248